United States Patent
Chioccola

(10) Patent No.: US 10,139,026 B2
(45) Date of Patent: Nov. 27, 2018

(54) SWIVEL JOINT WITH HYDRAULIC POSITION SIGNAL

(71) Applicant: CNH Industrial America LLC, New Holland, PA (US)

(72) Inventor: Francesco Chioccola, Settimo Torinese (IT)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/304,406

(22) PCT Filed: Apr. 9, 2015

(86) PCT No.: PCT/EP2015/057730
§ 371 (c)(1),
(2) Date: Oct. 14, 2016

(87) PCT Pub. No.: WO2015/158602
PCT Pub. Date: Oct. 22, 2015

(65) Prior Publication Data
US 2017/0045171 A1 Feb. 16, 2017

(30) Foreign Application Priority Data
Apr. 15, 2014 (IT) .............................. MO2014A0102

(51) Int. Cl.
*F16L 39/04* (2006.01)
*F16L 29/00* (2006.01)
(Continued)

(52) U.S. Cl.
CPC .............. *F16L 39/04* (2013.01); *F16L 29/00* (2013.01); *E02F 9/006* (2013.01); *F16L 27/093* (2013.01);
(Continued)

(58) Field of Classification Search
CPC ......... F16L 39/04; F16L 29/00; F16L 27/093; E02F 9/006; Y10T 137/0318; Y10T 137/86831
(Continued)

(56) References Cited

U.S. PATENT DOCUMENTS 3,685,397 A * 8/1972 Gooding, Jr. ........... F01B 17/00
285/273
4,286,686 A 9/1981 Franke
(Continued)

FOREIGN PATENT DOCUMENTS

CN 101173730 A 5/2008
CN 102278552 A 12/2011
(Continued)

OTHER PUBLICATIONS

Office Action in CN201580024972.7, dated Mar. 5, 2018, 10 pages (w/ translation).

*Primary Examiner* — Matthew W Jellett
*Assistant Examiner* — Christopher Ballman
(74) *Attorney, Agent, or Firm* — Peter K. Zacharias; Patrick M. Sheldrake

(57) ABSTRACT

A swivel joint including a pivot provided with a longitudinal axis; and a seating concentric to the pivot and in which the pivot is sealedly rotatable. The pivot includes an inlet conduit, a signal conduit, and a discharge conduit. The swivel joint further includes a connecting device, structured so as to assume a first configuration, in which it closes the inlet conduit and places the signal conduit in communication with the discharge conduit, and a second configuration, in which it places the inlet conduit in communication with the signal conduit and closes the discharge conduit. The connecting device is further structured so as to move between the first configuration and the second configuration follow- (Continued)

ing the rotation of the pivot with respect to the seating over a predetermined angle starting from an initial position.

15 Claims, 8 Drawing Sheets

(51) Int. Cl.
    *F16L 27/093* (2006.01)
    *E02F 9/00* (2006.01)
(52) U.S. Cl.
    CPC .. *Y10T 137/0318* (2015.04); *Y10T 137/86831* (2015.04)
(58) Field of Classification Search
    USPC .................................................. 137/625.21
    See application file for complete search history.

(56) References Cited

U.S. PATENT DOCUMENTS

| | | | |
|---|---|---|---|
| 5,198,800 A | 3/1993 | Tozawa et al. | |
| 5,439,029 A * | 8/1995 | Becker | B41F 13/00 137/580 |
| 5,462,083 A * | 10/1995 | Kaspar | F16L 27/087 137/580 |
| 6,339,929 B1 | 1/2002 | Udagawa et al. | |
| 6,485,062 B2 * | 11/2002 | Omiya | F16L 39/04 285/106 |
| 6,685,277 B1 | 2/2004 | Kohlmorgen et al. | |
| 7,798,738 B2 | 9/2010 | Kawamoto et al. | |
| 7,815,194 B2 * | 10/2010 | Suzuki | F16L 39/04 277/365 |
| 2002/0062587 A1 | 5/2002 | Kimoto et al. | |
| 2003/0122374 A1 * | 7/2003 | Ouchi | A61B 1/00142 285/124.1 |
| 2011/0049870 A1 * | 3/2011 | Takahashi | F16J 15/3404 285/282 |
| 2012/0160328 A1 | 6/2012 | Vivatson et al. | |
| 2015/0053450 A1 * | 2/2015 | Van Gemert | E02F 3/3681 173/218 |

FOREIGN PATENT DOCUMENTS

| | | |
|---|---|---|
| CN | 202117105 U | 1/2012 |
| CN | 202298691 U | 7/2012 |
| CN | 103649424 A | 3/2014 |
| CN | 103649559 A | 3/2014 |
| JP | H07-138995 A | 5/1995 |
| JP | 07-173857 A | 7/1995 |
| JP | 08-105739 A | 4/1996 |
| JP | 10-338945 A | 12/1998 |
| JP | H11-200411 A | 7/1999 |
| KR | 20030058378 A | 7/2003 |

* cited by examiner

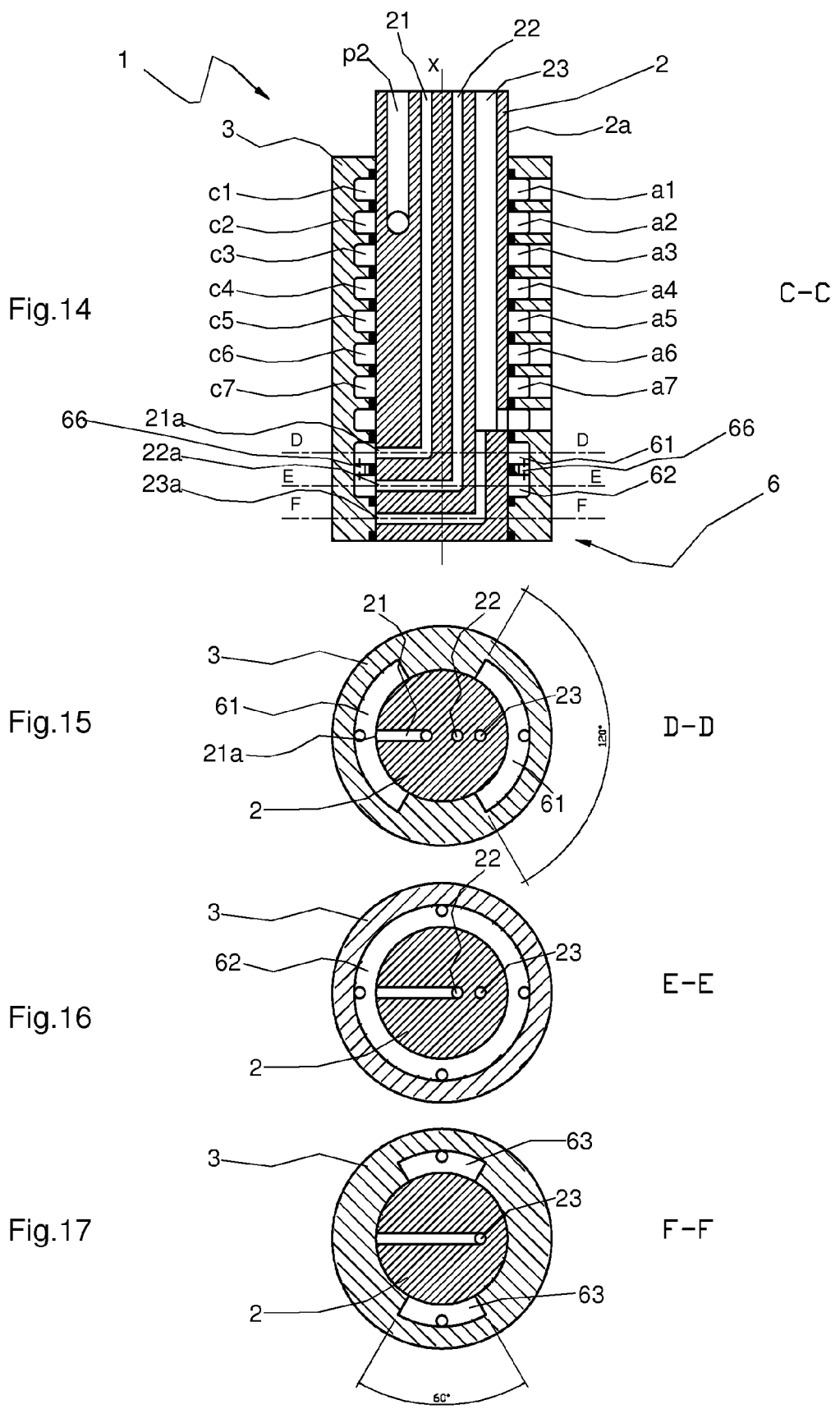

SWIVEL JOINT WITH HYDRAULIC POSITION SIGNAL

CROSS REFERENCE TO RELATED APPLICATION

This application is the National Stage of International Application No. PCT/EP2015/057730 filed Apr. 9, 2015, which claims priority to Italian Application No. MO2014A000102 filed Apr. 15, 2014, the contents of which are incorporated herein by reference.

The present invention relates to a swivel joint, in particular for a work vehicle equipped with a rotating turret.

Work vehicles equipped with a rotating turret comprise a frame, provided with wheels or tracks, on-board which the motor and one or more pumps are mounted for pressurization of the operating fluid, normally mineral oil, for activation of the various hydraulic devices with which the vehicle is equipped, for example rotary actuators and pistons.

The vehicles are normally provided with a swivel joint which enables transmitting the operating fluid from one or more pumps, located on-board the vehicle turret, to one or more actuators located on-board the lower frame or carriage. As known, the turret can rotate with respect to the lower frame about a vertical axis.

In the case of excavators, for example, the turret supports an articulated arm provided with a tool. By rotating with respect to the lower frame, the turret can bring the articulated arm and the tool connected to it into angular positions that are more or less taxing with respect to the stability of the vehicle. In general, considering the rest perimeter of the vehicle with respect to the ground, defined by the wheels or tracks the frame is provided with, the more the angular position of the turret displaces the overall center of gravity of the vehicle close to the ground-rest perimeter, the more the stability of the vehicle is reduced.

At present work vehicles equipped with a rotating turret are provided with a safety device that produces a sound in relation to the angular position assumed by the turret. In substance, if the turret is in an unfavorable angular position for the stability of the vehicle, an alarm sounds, so that the operator is informed of being in a position close to a determined safety limit, beyond which there would be a serious risk of tipping over.

Present safety devices comprise a position sensor, associated to the turret, which signals, to a control unit, that a determined angular position of the turret has been reached and/or exceeded. The control unit produces a warning sound until the turret returns into an angular position within an angle considered safer.

Apart from being relatively expensive, the position sensor is often not easily positionable on the turret, and requires predisposing further fixing structures, as well as plates for recognising the position. Further, the sensor is exposed to dust, and in general to environmental conditions, which might compromise correct functioning thereof.

An aim of the present invention is to provide a swivel joint which enables obviating the limitations of the presently-available systems.

An advantage of the joint of the present invention is to be able to produce a signal indicating a determined angular position without any need for electrical or electronic sensors, whether internal or external of the swivel joint.

A further advantage of the joint of the present invention is to produce a position signal in the form of a pressure in the operating fluid, so that the signal can be used directly for piloting valves or other hydraulic devices.

A further advantage of the present invention is that it enables producing a plurality of signals indicating respective angular positions.

Further characteristics and advantages of the invention will emerge from a reading of the description of an embodiment of the invention that follows, provided by way of non-limiting example, with the aid of the figures of the accompanying tables, in which.

Figure 9:
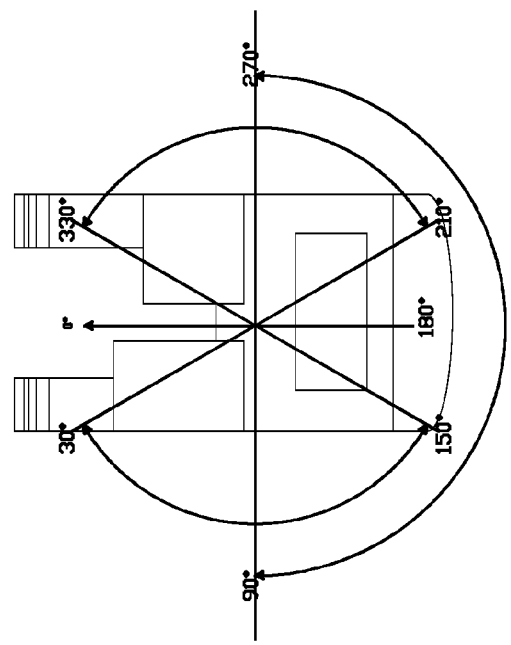
Figure 10:
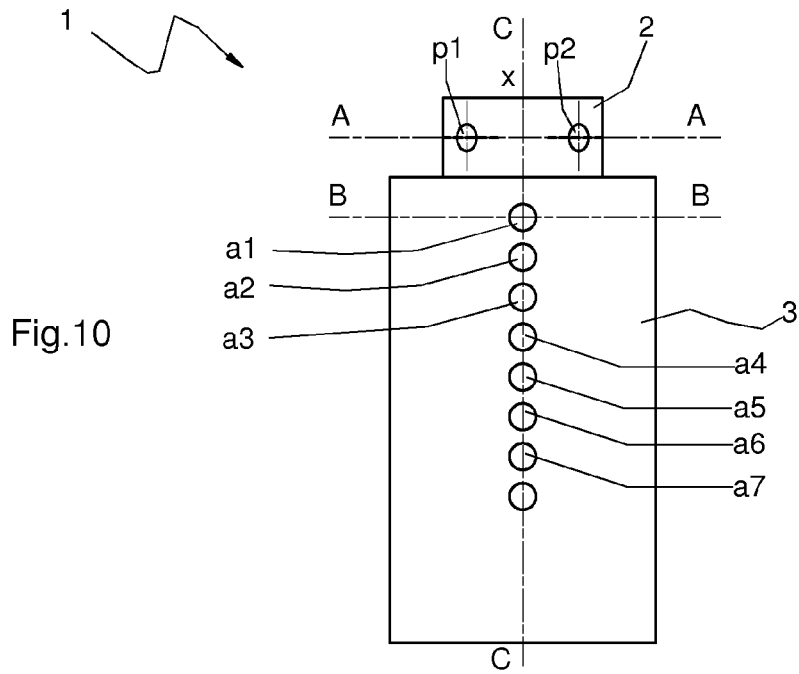
Figure 11:
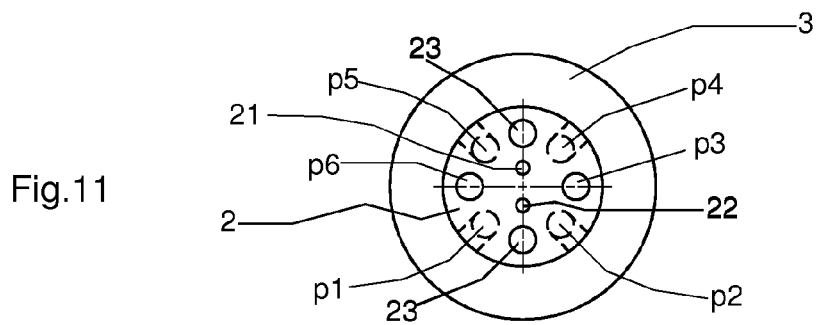
Figure 12:
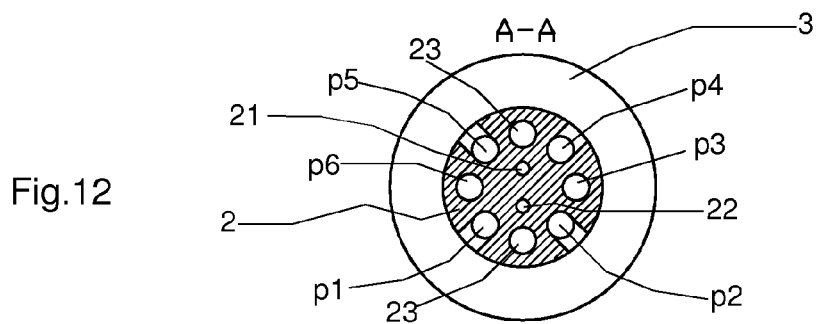
Figure 13:
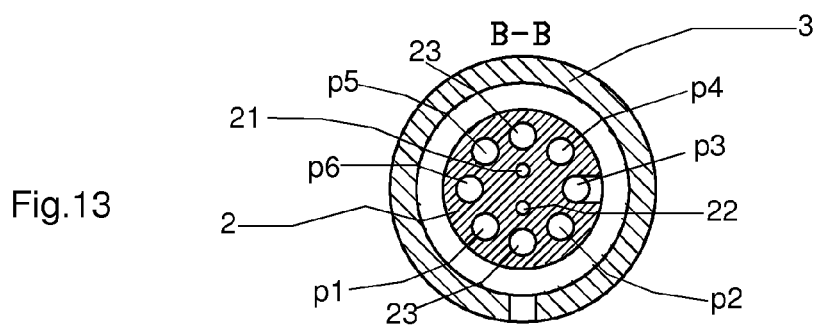
Figure 18:
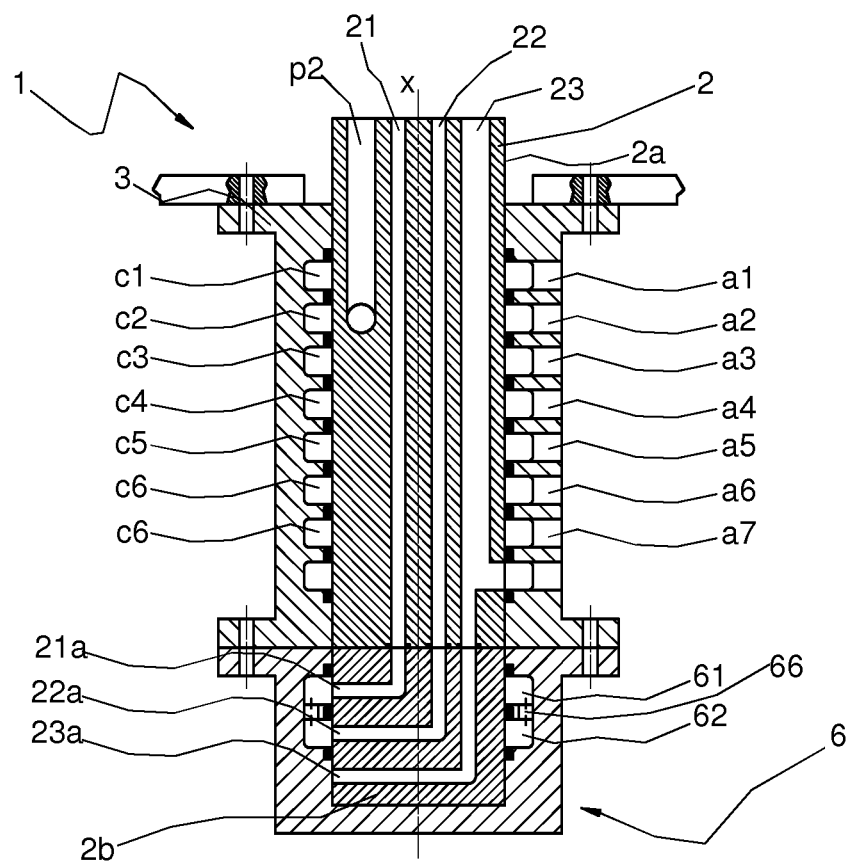
Figure 19:
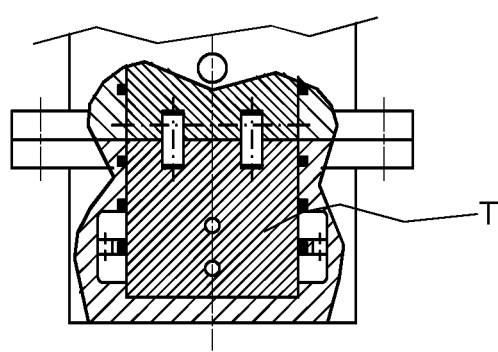
Figure 20:
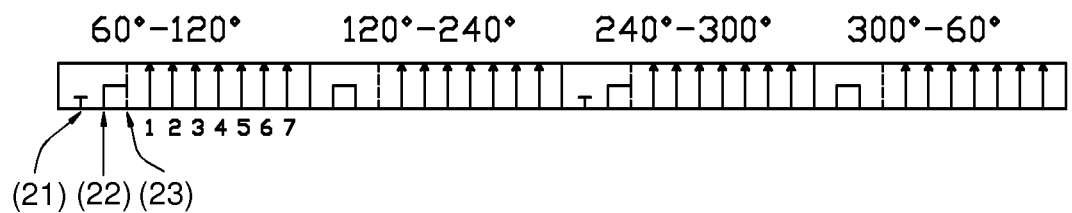
Figure 21:
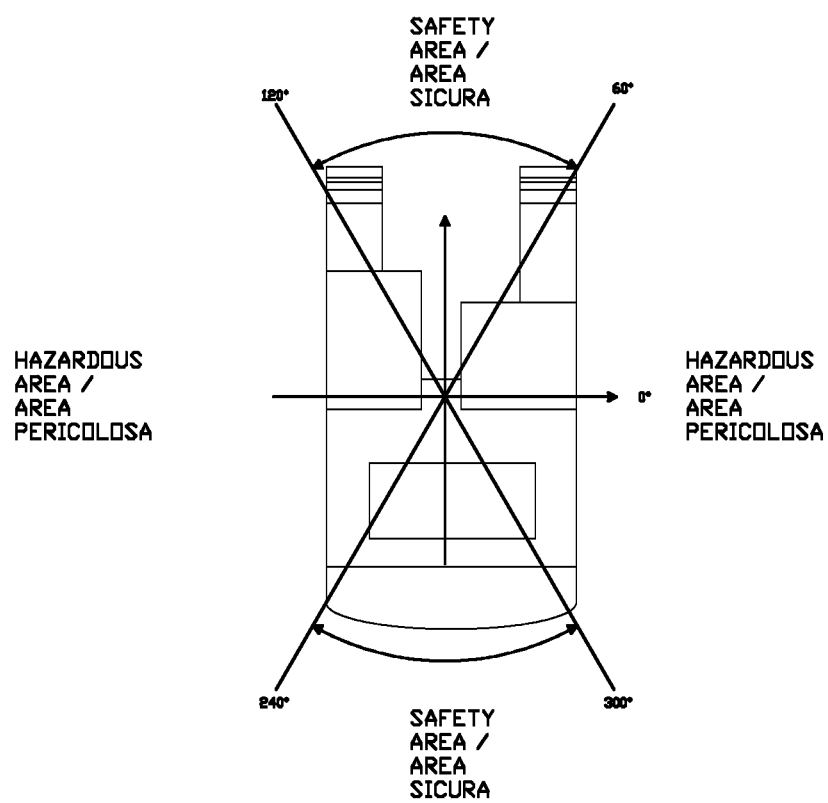

FIG. 9 schematically represents a work vehicle with a rotating turret, seen from above, superposed on a schematic representation of working angles identifiable by means of the embodiment of FIGS. 4,5,6,7;

FIG. 10 is a schematic view of a joint according to the present invention, in a second embodiment thereof;

FIG. 11 is a view from above of the joint of FIG. 10;

FIGS. 12 and 13 show section views of the joint of FIG. 10, carried out respectively along the planes indicated by A-A and B-B;

FIG. 14 is a section view of the joint of FIG. 10, performed on the plane indicated by C-C;

FIGS. 15,16 and 17 show section views of the joint of FIG. 14, made respectively on planes D-D, E-E, F-F;

FIG. 18 illustrates an alternative embodiment of the joint of FIG. 14;

FIG. 19 illustrates, in partial section, a second embodiment of the joint of FIG. 18;

FIG. 20 is a hydraulic diagram of the joint according to the present invention, with reference to the angular positions of FIG. 21;

FIG. 21 schematically represents a vehicle operator in rotating turret, superposed on a schematic representation of working angles considered safe or dangerous.

The swivel joint of the present invention comprises a pivot (2), provided with a longitudinal axis (X). The pivot (2) exhibits a cylindrical conformation, concentric to the longitudinal axis (X). The pivot (2) further comprises a plurality of through-conduits (p1, . . . pn) which, at an end thereof, open onto a lateral surface (2a) of the pivot (2) on distinct planes.

The joint further comprises a seating (3), concentric to the pivot (2) in which the pivot (2) is sealedly rotating. The seating (3) comprises a plurality of openings (a1, . . . an) which open into respective annular chambers (c1, . . . cn) which open on the external surface of the pivot (2) and which are sealedly separated from one another. Each annular chamber lies on a plane of an opening of the through-conduits (p1, . . . pn). In this way, each annular chamber, together with the openings thereof and the respective conduit (p1, . . . pn), substantially defines a conduit that can be used in a known way so as to link up two conduits connected to the joint.

The joint of the present invention advantageously further comprises a piloting conduit (21), which in inlet can be placed in communication with a source of pressurised fluid. In a preferred embodiment, the piloting conduit (21) is fashioned through the pivot (2).

Additionally to the piloting conduit (21), joint comprises a signal conduit (22), which in inlet can be placed in communication with the inlet conduit (21). In a preferred embodiment of the joint, the signal conduit (22) is also fashioned through the pivot (2).

The joint further comprises a discharge conduit (23), which in inlet can be placed in communication with the signal conduit (22) and which in outlet can be placed in communication with a low-pressure environment. The discharge conduit (23), too, can be fashioned through the pivot (2).

A connecting device (4, 6) is structured so as to assume a first configuration, in which it closes the inlet conduit (21), and a second configuration, in which it places the inlet conduit (21) in communication with the signal conduit (22). The connecting device (4, 6) is structured so as to displace between the first and the second configuration following the rotation of the pivot (2) with respect to the seating (3) over a predetermined angle starting from an initial position.

Conceived in the described way, the joint offers considerable advantages. The piloting conduit (21) can be connected to a source of pressurized fluid, for example the piloting circuit normally present on-board a work vehicle. In the second configuration of the connecting device (4, 6), the piloting conduit (21) is connected to the signal conduit (2) so that the fluid, at the piloting pressure, can be sent to an appropriate device able to react to the piloting pressure. The connecting device (4, 6) can be structured, for example, in such a way as to close the piloting conduit (21) so that the pivot (2) is within a certain angle of rotation with respect to the seating (3), starting from an initial position, in which the turret is in a stable position for the vehicle. By way of example, considering an initial position in which the turret positions the operating arm in a frontal position with respect to the vehicle and at a median longitudinal and vertical plane of the vehicle, the connecting device (4, 6) can be structured so as to keep the piloting conduit (21) closed as long as the turret is within an angle of ±30° with respect to the initial position, and to place the piloting conduit (21) in communication with the signal conduit (2) should the turret rotate beyond ±30° with respect to the initial position. The joint is therefore able to send a signal, in the form of a pressurized fluid, in a case in which the angular position between the pivot (2) and the seating (3) is outside a predetermined angle which can be defined as required in relation to the structure and the characteristics of the vehicle. There is no need for the presence of any sensor and/or electronic circuit for controlling the angular position between the pivot (2) and the seating (3).

In the first configuration thereof, the connecting device (4, 6) not only closes the piloting conduit (21) but also places the signal conduit (22) in communication with the discharge conduit (23). In the second configuration, the connecting device (4, 6) not only places the piloting conduit (21) in communication with the signal conduit (22), but also closes the discharge conduit (23).

Figure 1:
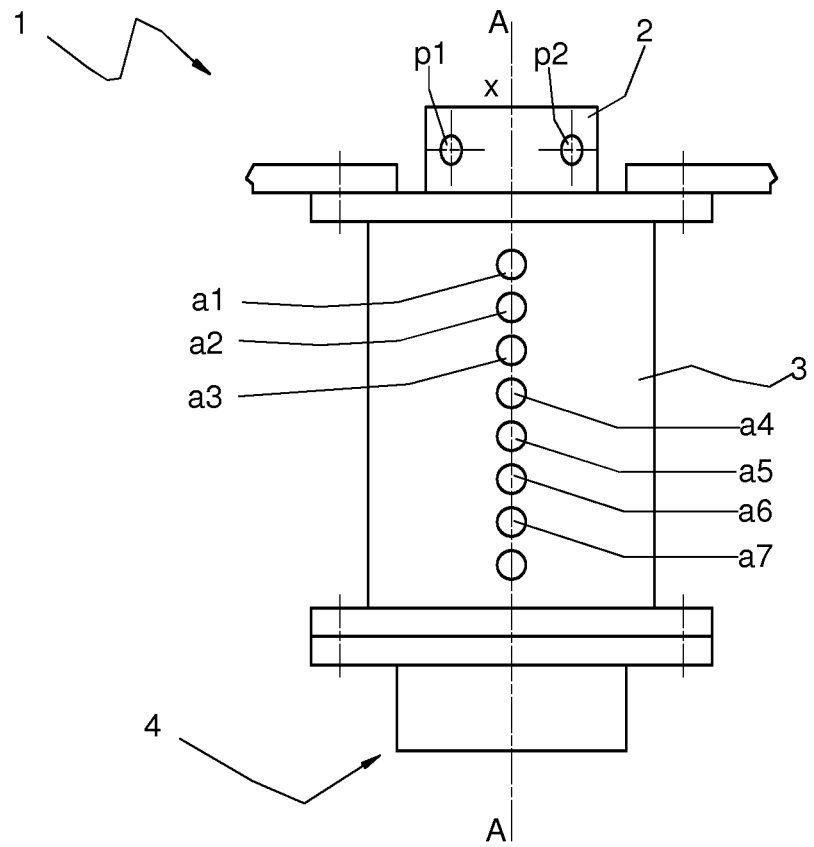
FIG. 1 is a schematic view of a joint according to the present invention, in a first embodiment thereof.
Figure 2:
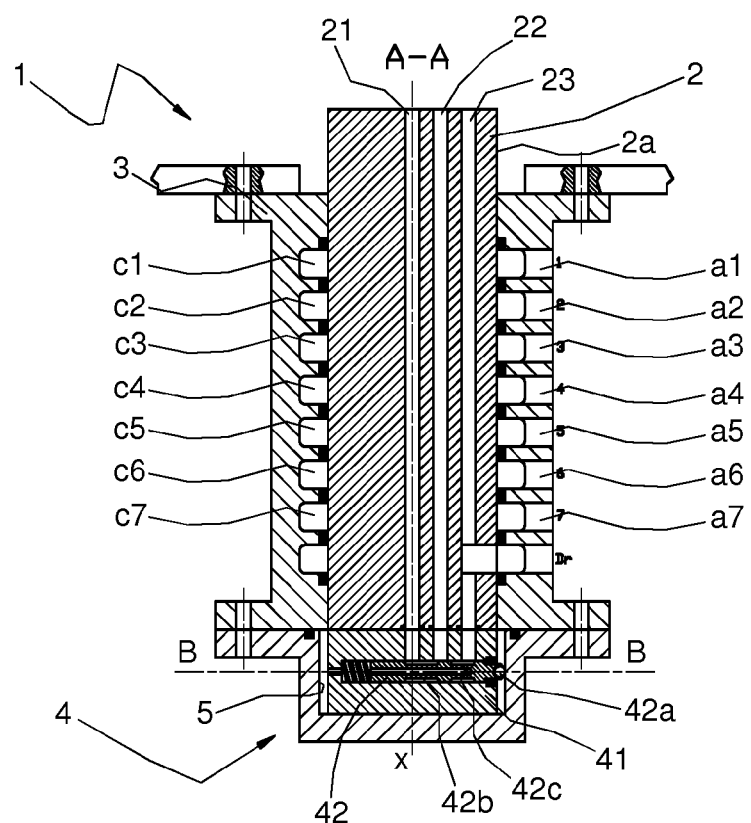
FIG. 2 is a section view along plane A-A of FIG. 1.
Figure 3:
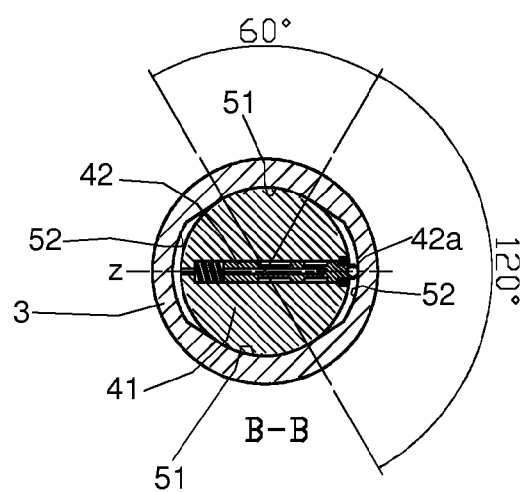
FIG. 3 is a section view along plane B-B of FIG. 2.
Figure 4:
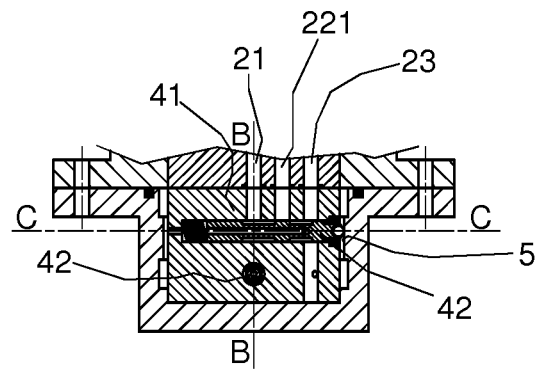
FIG. 4 illustrates an alternative embodiment of the joint of FIGS. 2 and 3.
Figure 5:
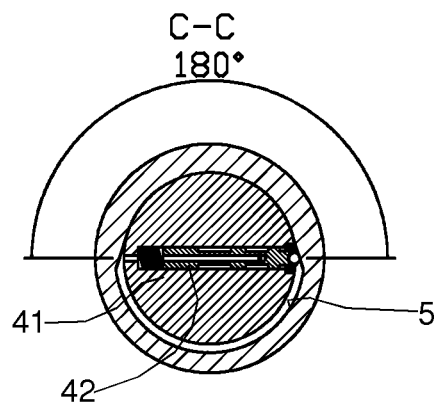
FIG. 5 is a section view of the joint of FIG. 4, made along the plane indicated by C-C.
Figure 6:
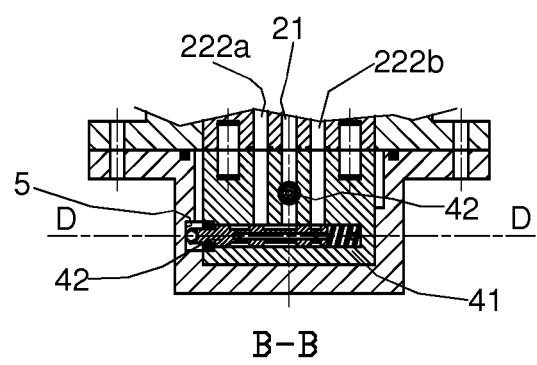
FIG. 6 is a section view of the joint of FIG. 4, made along plane B-B.
Figure 7:
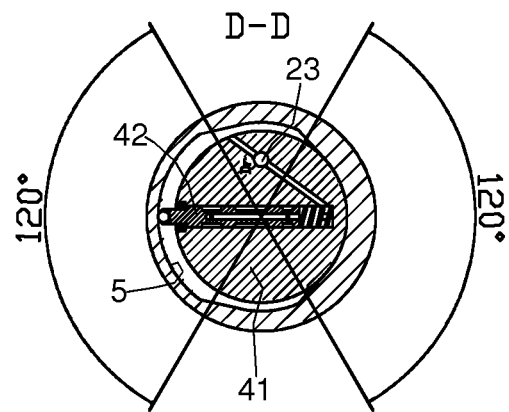
FIG. 7 is a section view of the joint of FIG. 6, made along plane D-D.
Figure 8:
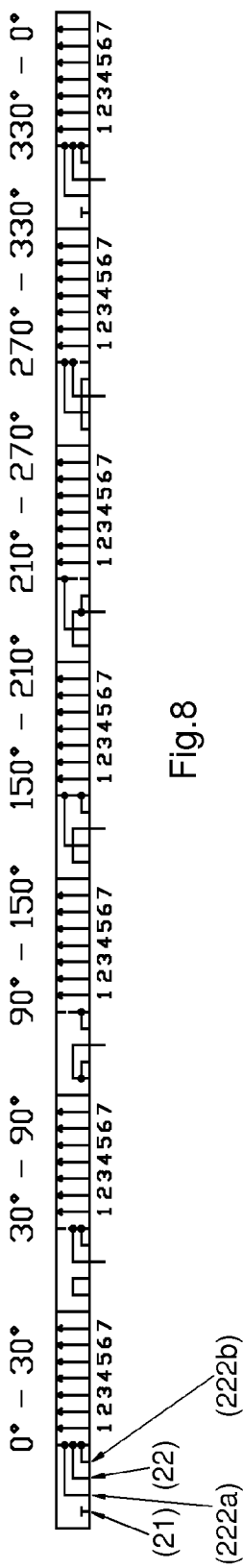
FIG. 8 is a hydraulic diagram of the joint according to the present invention, with reference to the angular positions of FIG. 9.

In a first advantageous embodiment, illustrated in FIGS. 1,2,3, the connecting device (4, 6) comprises a distribution valve (4), which is provided with a seating (41) and an obturator or spool (42) sealedly slidable in the seating (41). The distribution valve (4) is solidly constrained to the pivot (2) with respect to the rotation about the longitudinal axis (X).

A cam (5), solidly constrained to the rotation seating (3) of the pivot (2), is placed in contact with the obturator (42) so that the rotation of the pivot (2) with respect to the seating (3) determines a sliding of the obturator (42) by effect of the contact between the cam (5) and the obturator (42).

As can be seen in FIGS. 2 and 3, the obturator (42) is sealedly slidable within the seating (41) of the distribution valve (4), preferably along a sliding axis (Z) that is perpendicular to the longitudinal axis (X). The obturator is provided with an end (42a) that projects from the seating (41) in a substantially radial direction and is in contact with the cam (5).

The cam (5) is concentric to the longitudinal axis (X) and is substantially shaped as a profiled member which projects from the wall of the seating (3) towards an inside, in the direction of the longitudinal axis (X). The cam (5) is intersected by the perpendicular plane to the longitudinal axis (X) which contains the sliding axis (Z). The obturator (42) is pushed by an elastic means into contact with the cam (5).

The cam (5) comprises at least a first portion (51), arranged at a smaller radial distance with respect to the longitudinal axis (X), and at least a second portion (52), arranged at a radial distance that is greater with respect to the longitudinal axis (X).

When the pivot (2) is in an angular position in which the obturator (42) is in contact with the first portion (51) of the cam (5), the obturator is pushed into a first position, in which it closes the inlet conduit (21) and places the discharge conduit (23) in communication with the signal conduit (22). When the pivot (2) is in an angular position in which the obturator (42) is in contact with the second portion (52) of the cam (5), the obturator is pushed by the elastic means into a second position, in which it places the inlet conduit (21) in contact with the signal conduit (22) and closes the discharge conduit (23). In the embodiment shown in FIG. 3, the cam (5) exhibits two portions (51) symmetrical to one another with respect to the longitudinal axis (X), and two portions (52) symmetrical with one another with respect to the longitudinal axis (X). In this way, the obturator (42) assumes the first or second position in two different angles that are symmetrical with respect to the longitudinal axis (X). For example, in the case of a digger, the obturator can assume the first position when the turret is in a front or rear angular position comprised within two symmetrical safety angles, while it can assume the second position when the turret is in a lateral angular position, outside the safety angles.

As shown in FIG. 2, the inlet conduit (21), the signal conduit (22) and the discharge conduit (23) open into the seating (41) of the distribution valve (4). The obturator (42) exhibits at least two portions having a reduced section which define two annular chambers (42b, 42c). A first annular chamber (42b), in the second position of the obturator (42), places the piloting conduit (21) in communication with the signal conduit (22). A second annular chamber (42c), in the first position of the obturator (42), places the signal conduit (22) in communication with the discharge conduit (23).

In the illustrated embodiment the distribution valve (4) is a three-way two-position valve. It would also be possible to provide the distribution valve with a greater number of ways and positions. In particular, more signal conduits (22) could be predisposed, by structuring the obturator (42) so that it could realize respective connections between each signal conduit and the piloting conduit (21). The cam (5) might be structured so as to command the displacement of the obturator among the various positions, in relation to the angular position of the pivot (2) with respect to the seating (3), so that it would be possible to obtain a plurality of signals referred to different angular positions of the pivot (2) with respect to the seating (3).

In the embodiment described up to this point, the valve (4) is located preferably at an end of the pivot (2). The conduits (21, 22, 23) are fashioned through the pivot (2) and substantially exhibit an extension parallel to the longitudinal axis (X). While maintaining the inventive concept, a different arrangement of the valve (4) and the conduits (21, 22, 23) is within the ability of the technical expert in the sector.

The joint might also be provided with a plurality of distribution valves (4), each activated by a respective cam (5). In the example illustrated in figures from 4 to 9, the joint is provided with two distribution valves (4), each of which is three-way and two-position. Both the valves (4) are connected to the piloting conduit (21) and the discharge conduit (23), but each valve is connected to its own signal conduit (221,222a,222b). The cam (5) of each valve (4) is structured so as to determine the displacements of the relative obturator (42) in relation to the angles for which the signal is to be sent, substantially as described heretofore for the embodiment illustrated in FIGS. 2 and 3.

Advantageously, the seating or seatings (41) may be arranged in an appendage (2b) of the pivot (2) which is removable with respect to the pivot (2). The cam or cams (5) may be arranged on a tubular body (6) which is removable with respect to the seating (3) of the pivot (2).

In a second embodiment of the joint of the present invention, the piloting conduit (21) and the signal conduit (22) open on a lateral surface (2a) of the pivot (2), with respective openings (21a, 22a). The discharge conduit (23) also opens on the lateral surface (2a) via an opening (23a) thereof.

The connecting device (4, 6) comprises a tubular body (6), concentric to and solidly constrained to the rotation seating (3) of the pivot (2), in which the portion (2b) of the pivot (2) is sealedly rotating, on which the openings (21a, 22a,23a) of the piloting conduit (21), the signal conduit (22) and the discharge conduit (23) are fashioned.

The tubular body (6) comprises a first chamber (61), which opens on the lateral surface (2a) of the pivot (2) over a predetermined angle and can face the opening (21a) of the piloting conduit (21). In particular, the opening (21a) of the piloting conduit (21) is on a perpendicular plane to the longitudinal axis (X), which plane intersects the first chamber (61). The chamber (61), which preferably exhibits an annular arc conformation, extends over an angle which substantially corresponds to the angle within which the transmission of the signal through the signal conduit (22) is to be transmitted. In other terms, if the angular position of the pivot (2) is such that the opening (21a) of the piloting conduit (21) faces the chamber (61), the fluid at the piloting pressure fills the chamber (61) and, as will be described in the following, the signal is transmitted. As shown in FIG. 15, the joint can be provided with a first chamber (61), sub-divided into two distinct and symmetrical portions with respect to the longitudinal axis (X). This enables realizing the transmission of the signal internally of two angles, symmetrical to one another with respect to the longitudinal axis (X), for example in the case in which the turret bears the arm to the right or to the left of the vehicle, within an angle in which the opening (21a) of the piloting conduit (21) faces the chamber (61). In the angular positions in which the opening (21a) of the piloting conduit (21) does not face the first chamber (61), the piloting conduit (21) is closed.

A first chamber (61) can also be comprised which is sub-divided into a greater number of distinct chambers, each of which opens on the lateral surface (2a) of the pivot (2) over an angle corresponding to different angular positions of the pivot (2). This enables sending signals indicating various angular positions assumed by the pivot (2).

The tubular body (6) further comprises a second chamber (62), in communication with the first chamber (61), which surrounds the pivot (2) and opens on the lateral surface (2a) of the pivot (2). The second chamber (62) faces the opening (22a) of the signal conduit (22).

The first chamber (61) and the second chamber (62) are in mutual communication by means of one or more passages (66). In particular, the opening (22a) of the signal conduit (22) is on a perpendicular plane to the longitudinal axis (X), which plane intersects the second chamber (62) and is parallel to the lie plane of the opening (21a) of the piloting conduit (21). The second chamber (62), which exhibits an annular conformation, completely surrounds the pivot (2) so that the opening (22a) of the signal conduit (22) is always in communication with the second chamber (62). In this way, when the pivot (2) is in an angular position in which the piloting conduit (21) faces the first chamber (61), transmission of the signal is realized via the signal conduit (22), as the fluid in inlet through the piloting conduit (21) finds a free pathway through the first chamber (61), the second chamber (62), which is in communication with the first chamber (61), and through the signal conduit (22), which is always in communication with the second chamber (62).

The joint can be structured for sending a plurality of signals indicating different angular positions assumed by the pivot (2), realizing a corresponding number of signal conduits, each in communication with a respective annular chamber. Each annular chamber will be placed in communication with a corresponding portion of the first chamber (61) or, for the sake of ease of construction, with further annular chambers fed in series or in parallel by the piloting conduit (21), as described above for the embodiment illustrated in the figures.

The joint comprises a third chamber (63), in communication with the second chamber (63), which opens on the lateral surface (2a) of the pivot (2) over a predetermined angle and can face the opening (23a) of the discharge conduit (23). In particular, the third chamber (63) opens on the lateral surface (2a) over a complementary angle to the angle of the first chamber (61). In a case in which the first chamber (61) is sub-divided into two distinct and symmetrical portions with respect to the longitudinal axis (X), the third chamber (63) is also sub-divided into two distinct portions, symmetrical with respect to the longitudinal axis (X) and complementary to the portions of the first chamber (61). This means that when the pivot (2) is in an angular position in which the piloting conduit (21) does not face the first chamber (61), and is therefore closed, the discharge conduit (23) faces the third chamber (63), and the signal conduit (22) is therefore in communication with the discharge conduit (23).

As shown in FIG. 11, the opening (23a) of the discharge conduit (23) is on a perpendicular plane to the longitudinal axis (X), which plane intersects the third chamber (63) and is parallel to the lie plane of the opening (22a) of the signal conduit (22). The opening (23a) of the discharge conduit (23) is preferably on the opposite side of the opening (22a) of the signal conduit (22) with respect to the opening (21a)

of the piloting conduit, so that the first chamber (61) and the third chamber (63) are on opposite sides with respect to the second chamber (62).

The tubular body (6) can advantageously be removable with respect to the rotation seating (3) of the pivot (2); and at least a terminal portion and the openings (21*a*, 22*a*, 23*a*) of the inlet conduit (21), the signal conduit (22) and the discharge conduit (23) can be located on an appendage (2*b*) of the pivot (2) which is removable with respect to the pivot (2) itself, as shown in FIGS. 12 and 13. This, for example, enables replacing the tubular body (6) and the appendage (2*b*) with a tubular body and an appendage structure for sending the signal in different angles and/or for sending a plurality of signals if further signal conduits are already afforded in the pivot (2). The appendage (2*b*) can also be removed and replaced by a closure element (T), solidly constrained in rotation to the pivot (2), which substantially transforms the joint of the present invention into a traditional swivel joint.

The invention claimed is:

1. A swivel joint, comprising:
    a pivot provided with a longitudinal axis, the pivot comprising:
        an inlet conduit comprising an inlet configured to be placed in communication with a source of pressurized fluid;
        a signal conduit comprising an inlet configured to be placed in communication with the inlet conduit;
        a discharge conduit comprising an inlet configured to be placed in communication with the signal conduit and an outlet configured to be placed in communication with a low-pressure environment;
    a seating concentric to the pivot and in which the pivot is sealedly rotatable; and
    a connecting device, structured so as to assume a first configuration, in which it closes the inlet conduit and places the signal conduit in communication with the discharge conduit, and a second configuration, in which it places the inlet conduit in communication with the signal conduit and closes the discharge conduit wherein the connecting device is further structured so as to move between the first configuration and the second configuration following rotation of the pivot with respect to the seating for the pivot over a predetermined angle starting from an initial position.

2. The swivel joint of claim 1, wherein the connecting device comprises:
    a distribution valve comprising a seating and an obturator that is sealedly slidable within the seating of the distribution valve, the distribution valve solidly constrained to the pivot with respect to rotation about the longitudinal axis; and
    a cam, solidly constrained to the seating for the pivot, and in contact with the obturator so that the rotation of the pivot with respect to the seating for the pivot determines a sliding of the obturator.

3. The swivel joint of claim 2, wherein the cam is concentric to the longitudinal axis and comprises at least a first portion, arranged at a first radial distance with respect to the longitudinal axis, and at least a second portion, arranged at a second radial distance with respect to the longitudinal axis, the second radial distance greater than the first radial distance.

4. The swivel joint of claim 3, wherein the cam is concentric to the longitudinal axis at a reference radial distance, the cam comprising at least a first portion at a radial distance that is smaller than the reference radial distance and at least a second portion at a radial distance that is greater than the reference radial distance.

5. The swivel joint of claim 4, wherein:
    the first portion and the second portion of the cam are arranged such that:
        in an angular position of the pivot in which the obturator contacts the first portion, the obturator is in a first position, in which it closes the inlet conduit and places the signal conduit in communication with the discharge conduit; and
        in an angular position of the pivot in which the obturator contacts the second portion, the obturator is in a second position, in which it places the inlet conduit in communication with the signal conduit and closes the discharge conduit.

6. The swivel joint of claim 5, wherein the obturator is pushed towards the second position thereof, and in contact with the cam, by an elastic portion.

7. The swivel joint of claim 3, wherein the obturator is sealedly slidable in the seating of the distribution valve along a sliding axis perpendicular to the longitudinal axis.

8. The swivel joint of claim 3, wherein:
    the inlet conduit, the signal conduit, and the discharge conduit open into the seating of the distribution valve, and
    the obturator is sealedly slidable in the seating of the distribution valve between a first position, in which it closes the inlet conduit and places the signal conduit in communication with the discharge conduit, and a second position, in which it places the inlet conduit in communication with the signal conduit and closes the discharge conduit.

9. The swivel joint of claim 2, wherein the seating of the distribution valve is arranged in an appendage of the pivot which is removable with respect to the pivot, and wherein the cam is arranged on a tubular body which is removable with respect to the seating for the pivot.

10. The swivel joint of claim 1, further comprising:
    one or more distribution valves, solidly constrained to the pivot with respect to rotation about the longitudinal axis; and
    one or more cams, solidly constrained to the seating for the pivot, each of the one or more cams placed in contact with an obturator of a respective valve.

11. The swivel joint of claim 1, wherein:
    the inlet conduit, the signal conduit, and the discharge conduit open on a lateral surface of the pivot,
    the connecting device comprises a tubular body, concentric to and solidly constrained to the seating for the pivot, in which a portion of the pivot sealedly rotates, on which portion of the pivot openings of the inlet conduit, the signal conduit, and the discharge conduit are located;
    wherein the tubular body comprises:
        a first chamber, which opens on the lateral surface of the pivot over a predetermined angle and is configured to face the opening of the inlet conduit;
        a second chamber, in communication with the first chamber, the second chamber surrounding the pivot and opening on the lateral surface of the pivot, facing the opening of the signal conduit; and
        a third chamber, in communication with the second chamber, the third chamber opening on the lateral surface of the pivot over a predetermined angle and configured to face the opening of the discharge conduit.

12. The swivel joint of claim 11, wherein:
the openings of the inlet conduit, the signal conduit, and the discharge conduit are located on distinct planes along the longitudinal axis, and
the first chamber, the second chamber, and the third chamber are aligned respectively with a plane of the openings of the inlet conduit, the signal conduit, and the discharge conduit.

13. The swivel joint of claim 11, wherein the tubular body is removable with respect to the seating for the pivot.

14. The swivel joint of claim 11, wherein the openings of the inlet conduit, the signal conduit, and the discharge conduit are located on an appendage of the pivot which is removable with respect to the pivot.

15. An excavator, comprising:
a lower portion; and
an upper portion, the upper portion rotatable with respect to the lower portion; and
a swivel joint according to claim 1 located between the lower portion and the upper portion.

\* \* \* \* \*